United States Patent [19]

Thiel et al.

[11] Patent Number: 4,658,938
[45] Date of Patent: Apr. 21, 1987

[54] SPREADING SPRING FOR A FLOATING-CALIPER OR FIST-TYPE CALIPER SPOT-TYPE DISC BRAKE FOR AUTOMOTIVE VEHICLES

[75] Inventors: Rudolph Thiel, Frankfurt am Main; Ulrich Klimt, Reinheim; Hans Bungert, Geisenheim, all of Fed. Rep. of Germany

[73] Assignee: Alfred Teves GmbH, Frankfurt am Main, Fed. Rep. of Germany

[21] Appl. No.: 738,033

[22] Filed: May 24, 1985

[30] Foreign Application Priority Data

May 25, 1984 [DE] Fed. Rep. of Germany ....... 3419523

[51] Int. Cl.⁴ .............................................. F16D 65/40
[52] U.S. Cl. ................................ 188/73.38; 188/73.35
[58] Field of Search ............... 188/73.35, 73.36, 73.37, 188/73.38, 380, 72.3

[56] References Cited

FOREIGN PATENT DOCUMENTS

| 2114812 | 10/1971 | Fed. Rep. of Germany | 188/73.38 |
| 2844470 | 4/1980 | Fed. Rep. of Germany | 188/73.38 |
| 1388749 | 1/1965 | France | 188/73.38 |
| 0065733 | 5/1980 | Japan | 188/73.37 |
| 1037238 | 7/1966 | United Kingdom | 188/73.38 |
| 1577421 | 10/1980 | United Kingdom | |
| 2111616 | 7/1983 | United Kingdom | |

Primary Examiner—Douglas C. Butler
Assistant Examiner—Lawrence J. Goffney, Jr.
Attorney, Agent, or Firm—James B. Raden; William J. Michals

[57] ABSTRACT

A spreading spring for a floating-caliper or a fist-type caliper spot-type disc brake for automotive vehicles, comprising a spreading spring portion (30) which extends substantially in axial direction and forms two legs (34,36), the end portions of the legs (34,36) abutting on backing portions of brake pads (16,18). A resilient bracket (28) connected thereto extends substantially in circumferential direction and forms two legs (54,56) with the ends of the resilient bracket being supported on retaining pins (22,24). To accomplish favorable force distribution of the spring without impairing the function of the brake, the legs (34,36) of the spreading spring portion (30) are of different length, the ends of the resilient bracket (28) contain indentations (58,60) which provide contact points for abutment of the resilient bracket legs (54,56) on the respective retaining pins, and that indentations (58,60) are disposed on that side of the resilient bracket (28) which is close to the longer leg (36) of the spreading spring portion (30).

9 Claims, 5 Drawing Figures

SPREADING SPRING FOR A FLOATING-CALIPER OR FIST-TYPE CALIPER SPOT-TYPE DISC BRAKE FOR AUTOMOTIVE VEHICLES

BACKGROUND OF THE INVENTION

The invention relates to a spreading spring for a floating-caliper or fist-type caliper spot-type disc brake for automotive vehicles.

In the design and arrangement of the spring of floating-caliper or fist-type caliper brakes, a problem arises that, as the brake pads wear off, the caliper is displaced towards the inner side (i.e., opposite to the direction of motion of the brake piston) with the spreading spring being pulled in the same direction. Known spreading springs, as shown for example in DE-AS No. 1 182 087, therefore cannot be used for such brakes, since even in case of relatively low wear of the pads the resilient bracket is pressed against the inner pad (i.e., the one disposed on the actuating side) and thus renders the functioning of the brake impossible. Therefore, the object of the present invention is to create a spreading spring for a floating-caliper or a fist-type caliper spot-type disc brake which allows a high degree of wear of the pads without impairing the functioning of the brake and which in particular ensures a favorable distribution of the force of the spreading spring onto the pads.

SUMMARY OF THE INVENTION

The solution in accordance with the present invention is to create a spreading spring which, when used in floating-caliper and spot-type disc brakes, even in case of extreme wear of the brake pads does not impair the functioning of the brake, while allowing nevertheless a favorable distribution of the pressing and spreading forces exerted by the spreading spring onto the brake pads. The indentations provided at the ends of the resilient bracket define contact points ensuring that the points of application of the resilient bracket are disposed as far as possible to the inside towards the brake disc.

An advantageous design in accordance with the present invention provides that the legs of the resilient bracket are disposed at an obtuse angle to each other in the shape of a V. The middle portion of the resilient bracket expediently contains a substantially U-shaped bend in which the spreading spring portion is arranged.

In order to have sufficient space on the actuating side to mount the spring, a further arrangement of the invention is that the longer leg of the spreading spring portion facing the actuating side comprises a substantially Z-shaped bend. In order to provide support for the spreading spring on this side, the end of the longer leg of the spreading spring portion may be bent at a right angle. The main part of the longer leg of the spreading spring portion, however, can be disposed parallel to the axis of the brake disc, since it is bent upwards when the spreading spring is mounted and is then disposed at a slight angle to the axis so that the required spreading effect is achieved.

In order to ensure that this spreading effect is also achieved by the short leg of the spreading spring portion, it is advantageous that this leg is bent upwards at a slight angle—i.e., away from the axis of the brake disc. To stiffen the longer leg of the spreading spring portion, this leg is curved in its cross section.

Since the spreading spring portion also serves the purpose of supporting the spreading spring in axial direction on the housing, the legs of the resilient bracket are so designed that they have projections which extend in axial direction and are disposed on the side of the shorter leg of the spreading spring portion to provide for those cases where a support on the housing is not easily possible. By way of these projections the spring can be supported in axial direction on the rear plate of the pad facing it.

BRIEF DESCRIPTION OF THE DRAWING

Embodiments of the present invention and its arrangements are shown, by way of example, in the accompanying drawings wherein.

DETAILED DESCRIPTION

Figure 1:
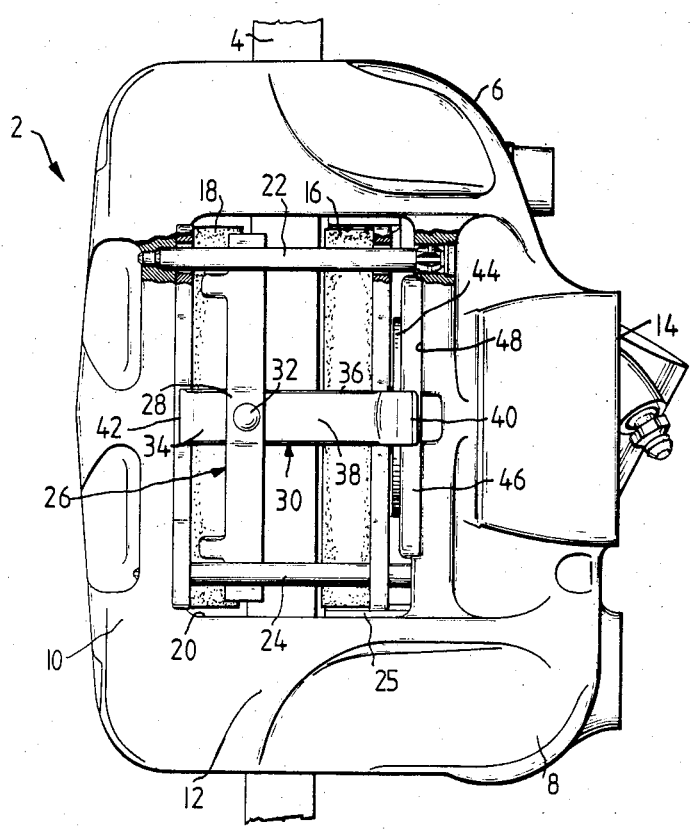
FIG. 1 is a top view of a disc brake with a spreading spring.
Figure 2:
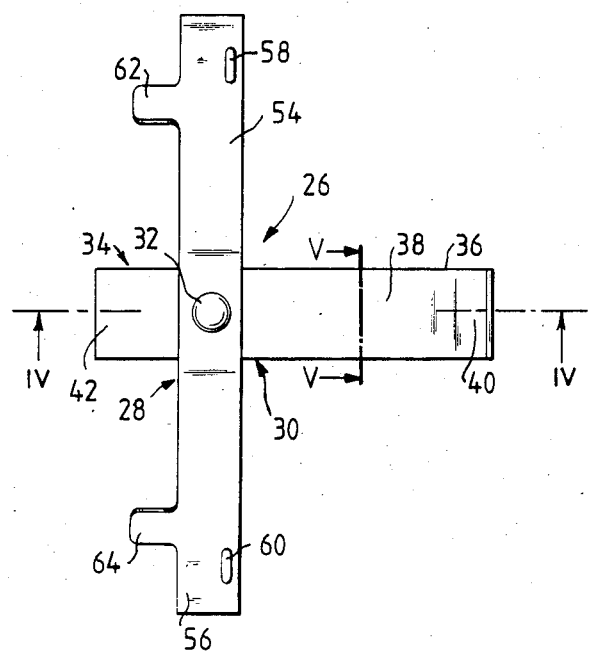
FIG. 2 is an enlarged view of the spreading spring according to FIG. 1.
Figure 3:
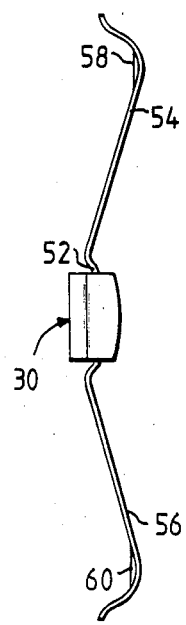
FIG. 3 is a front view of the spreading spring according to FIG. 2.
Figure 4:
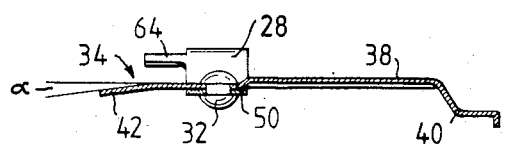
FIG. 4 shows a cross-section of the spreading spring according to FIG. 2 in axial direction; and, FIG. 5 shows a cross-section of the spreading spring portion along the line V—V in FIG. 2.
Figure 5:
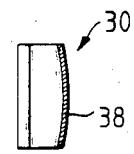

The first-type caliper spot-type disc brake 2 shown in FIG. 1 comprises a caliper 6 straddling the edge of a brake disc 4 and having a substantially U-shaped cross section, as well as a brake support (not shown) supporting the caliper 6 so that it is slidable in axial direction. The caliper 6 forms two legs 8 and 10 extending radially along the sides of the brake disc 4 and connected to each other by a bridge portion 12. The inner leg 8 contains an actuating device 14 (not shown in detail) comprising a brake piston. A brake pad 16 or 18 is arranged on each side of the brake disc between the brake disc and the legs 8, 10 of the caliper 6. For this purpose, a recess 20 is provided in the bridge portion 12 to receive the brake pads 16, 18 when they are mounted and in which the portions of the brake pads 16, 18 facing radially outward are disposed in mounted condition. The brake pads 16, 18 are retained by pad retaining pins 22, 24. The brake forces acting on the inner brake pad 16 are stayed on the brake support 25, while the forces acting on the outer brake pad 18 are stayed by the caliper 6. In order to push the brake pads 16, 18 axially outward, i.e. away from the brake disc 4, and to prevent a clattering of the pads, a spreading spring 26 is provided. This spring consists of a resilient bracket 28 extending in circumferential direction and a spreading spring portion 30 extending in axial direction, which are connected with each other by means of a round head rivet 32 disposed at their intersection. The spreading spring portion 30 forms two legs 34, 36 which are determined by the position of the resilient bracket 28. In mounted position the longer leg 36 extends towards the actuating device 14, while the shorter leg 34 extends outward. The leg 36 comprises a main portion 38 of a curved cross-section and an adjoining end section 40 in the form of a Z-shaped bend. The short leg 34 comprises an end section 42 which in relation to the main portion 38 of the leg 36 is inclined at a slight angle $\alpha$. The inclined end section 42 ensures, in mounted condition, that the leg 36 abuts on the inner edge of the rear plate of the brake pad facing the brake disc and thus effects a force component in axial direction. For the long leg 36 this axial force component is reached by its being bent upward in mounted position and thus also being inclined at a slight angle in relation to its original position. The Z-shaped, bent end section 40 ensures that there is sufficient space on the actuating side, since there the spreading spring must reach beyond the rim of the piston 44 of the actuating device 14 and beyond a protective collar 46 to abut on the wall 48 limiting the recess 20. Toward the leg 34, the main portion 38 of the leg 36 verges into an offset fastening section 50 for the resilient bracket 28. The fastening section 50 in turn verges into the short leg 34.

The resilient bracket 28 comprises two legs 54, 56 extending from a middle fastening section 52 in circumferential direction whose ends form a substantially U-shaped bend allowing them to engage the pad retaining pins 22, 24 by passing under and partly around them so as to exert the necessary clamping and/or spreading forces. The sections of the U-shaped bends contain oblong indentations 58, 60 extending in circumferential direction by which the resilient bracket legs 54, 56 abut on the pad retaining pins 22, 24 so as to provide defined contact points. The indentations 58, 60 are disposed as close as possible to the edge of the resilient bracket facing the side of the longer leg 36. Due to this arrangement the effective length of the short leg 34 can be further increased, thus further enhancing the uniformity of force distribution onto the two legs 34, 36 of the spreading spring portion 30. Close to the indentations 58, 60, i.e. in the section coming close to the pad retaining pins 22, 24 in mounted condition, the legs 54, 56 are designed so as to form projections 62, 64 extending axially and facing the direction of the short leg 34, which serves for abutment of the spreading spring in cases where no axial support is possible on the respective side of the housing or where a twisting of the resilient bracket is to be avoided.

What is claimed is:

1. A spreading spring for a floating-caliper or a fist-type caliper spot-type disc brake for automotive vehicles, comprising a spreading spring portion which extends substantially in axial direction and forms two legs, the end portions of said legs abutting on backing portions of brake pads, and a resilient bracket connected thereto which extends substantially in circumferential direction and forms two legs, the ends of said resilient bracket being supported on retaining pins, wherein the legs (34,36) of the spreading spring portion (30) are of different length, wherein the ends of the resilient bracket (28) contain indentations (58,60) which provide contact points for abutment of the resilient bracket legs (54,56) on the respective retaining pins, and wherein the indentations (58,60) are disposed on the side of the resilient bracket (28) which is close to the longer leg (36) of the spreading spring portion (30).

2. Spreading spring as claimed in claim 1, wherein the legs (54,56) of the resilient bracket (28) are disposed at an obtuse angle to each other in the shape of a V.

3. Spreading spring as claimed in claim 2 wherein the resilient bracket (28) in its middle portion contains a fastening section in the form of a substantially U-shaped bend in which the spreading spring portion (30) is arranged.

4. Spreading spring as claimed in claim 1, wherein the longer leg (36) of the spreading spring portion (30) contains in its end section a substantially Z-shaped bend.

5. Spreading spring as claimed in claim 1, wherein the end of the longer leg (36) of the spreading spring portion (30) is bent at a right angle with respect to the plane of the longer leg (36).

6. Spreading spring as claimed in claim 1, wherein a portion of the short leg (42) of the spreading spring portion (30) is bent at an acute angle ($\alpha$) with respect to the plane of the remaining portion of the short leg (34).

7. Spreading spring as claimed in claim 1, wherein the longer leg (36) of the spreading spring portion is curved in its cross-section.

8. Spreading spring as claimed in claim 1 wherein the legs (54,56) of the resilient bracket (28) comprise projections (62,64) extending in axial direction of the caliper and disposed on the side of the shorter leg (34) of the spreading spring portion (30).

9. Spreading spring as claimed in claim 1, wherein the legs (54, 56) of the resilient bracket (28) abut on the retaining pins (22, 24).

* * * * *